United States Patent [19]

Wiart

[11] Patent Number: 4,518,908
[45] Date of Patent: May 21, 1985

[54] CONTROL CIRCUIT OF A SYNCHRONOUS MOTOR WITH TWO INDUCTION WINDINGS

[75] Inventor: Albert Wiart, Sannois, France
[73] Assignee: Jeumont-Schneider Corporation, France
[21] Appl. No.: 531,772
[22] Filed: Sep. 13, 1983

[30] Foreign Application Priority Data

Oct. 7, 1982 [FR] France .................. 82 16786

[51] Int. Cl.³ ............................................. H02P 5/40
[52] U.S. Cl. .................................. 318/723; 318/722; 363/37; 363/138
[58] Field of Search ............... 318/722, 723; 363/43, 363/71, 34, 36, 37, 38, 40, 136–138

[56] References Cited

U.S. PATENT DOCUMENTS 3,775,662  11/1973  Compoly et al. ............... 363/43
4,288,732  9/1981   Wilson et al. ................... 318/723

FOREIGN PATENT DOCUMENTS 0039281  4/1981  European Pat. Off. .
1538150  1/1970  Fed. Rep. of Germany .
2196736  3/1974  France .
2385252  3/1977  France .
2452200  3/1979  France .
2479600  3/1980  France .

Primary Examiner—David Smith, Jr.
Attorney, Agent, or Firm—Rines and Rines, Shapiro and Shapiro

[57] ABSTRACT

A control circuit of a synchronous motor with two induction windings, including an electrical power supply assembly (5), two oscillators (2,3) whose outputs are connected respectively to the windings of the motor (1), an intermediary circuit (4), connected on one side to the power supply and on the other to the oscillators, and a central unit for control of the thyristors.

The electrical power supply assembly (5) delivers a current of a given unique polarity, and has its output terminals connected by means of a freewheel branch including at least one freewheel diode (6) whose cathode is connected to the positive terminal. The intermediary circuit includes, in combination:

a branch composed of two thyristors (10,11) in series, between them connecting the input terminals of the intermediary circuit (4), which are connected respectively to one of the input terminals of the oscillators, in a manner such that the terminals chosen are of opposite polarity, a condenser (14) connected on one side to the junction point of the two thyristors (10,11) of this branch, and on the other side to the two other input terminal of opposite polarity of the oscillators (2,3), two inductances (12,13) of equal value presenting a high coupling factor by mutual induction, respectively connected in series with one of the input terminals of the oscillators (2,3), the terminals chosen being of opposite polarity. Application to railway traction motors.

4 Claims, 4 Drawing Figures

CONTROL CIRCUIT OF A SYNCHRONOUS MOTOR WITH TWO INDUCTION WINDINGS

The present invention concerns a control circuit of a synchronous motor with two induction windings, permitting in particular a smooth starting of the motor.

The use of oscillators with natural commutation to control a synchronous motor with variable speed is well known.

However, certain steps must be undertaken to provide starting of the motor, since the natural de-energizing of the thyristors of the oscillator cannot be ensured by the motor itself at low speed, because the motor does not produce a sufficient electromotive force in this case. In a general way, it is therefore necessary to negate the direct current in the oscillator regularly to de-energize the thyristors employed, and then to energize a new set of thyristors after reestablishing the applied direct current.

From this negation of the current and its reestablishment, there results an irregular motor torque on starting, and by consequence inopportune surges.

The use of synchronous motors with two induced windings electrically phase-separated, for example by 30° in the case of three-phase motors, permits attenuation of these surges at low speed of rotation of the motor, without suppressing them totally, however, and also provides a greater regularity of the motor torque at higher speeds.

French Pat. No. 2 452 200 describes a control circuit for suppression of these irregularities in the motor torque on starting, by compensating for the reduction in motor torque resulting from nullification of the current in one winding commutation of the thyristors, by an increase in the current applied to the other winding, in such a way that at low speeds, and in particular on starting of the motor, the sum of the instantaneous currents flowing in all the windings of the motor will be constant.

However, the circuit described is not suitable if the power supply includes a chopper or a mixed bridge rectifier. The goal of the invention is to obviate this drawback and to provide starting without irregularity of the motor torque.

The invention thus has as its object a process and an apparatus for commutation of the thyristors of two oscillators supplying power to a synchronous motor with two induction windings during starting of the motor and at low speed.

According to the invention, the control circuit of a synchronous motor with two induction windings comprises an electric power supply mechanism, two oscillators whose outputs are connected respectively to the windings of the motor, an intermediate circuit connected on the one side to the power supply and on the other to the oscillators, and a central thyristor control unit. The electrical power supply delivers a current with a determined unique direction of flow, and its output terminals are connected through a freewheel branch including at least one freewheel diode whose cathode is connected to the positive terminal of the power supply. The intermediary circuit comprises, in combination:

a branch constituted by two thyristors in series, connecting the input terminals of the intermediary circuit, which are connected respectively to one of the input terminals of the oscillators so that the terminals chosen are of inverse polarity;

a condenser connected on one side to the junction point of the two thyristors of this branch, and on the other side to the two other input terminals of inverse polarity of the oscillators;

two inductances of the same value presenting a high coupling factor by mutual inductance, connected respectively in series with one of the input terminals of the oscillators, with the terminals selected being of inverse polarity.

According to another aspect of the invention concerning a process of commutation of the thyristors of two oscillators supplying power to a synchronous motor with two induction windings, during the starting of the motor and at low speeds, and connected to an electrical power supply whose output terminals are connected through a branch including at least one freewheel diode, the suppression of the current flowing in the thyristors of each oscillator to be commutated is brought about in a freewheel phase during which the branch placed at the output of the power supply is conductive.

The invention will be better understood, and other goals, advantages and characteristics will become clearer, through the reading of the following description, accompanied by four figures, illustrating in a non-limitational manner, preferred modes of realization of the invention.

Figure 1:
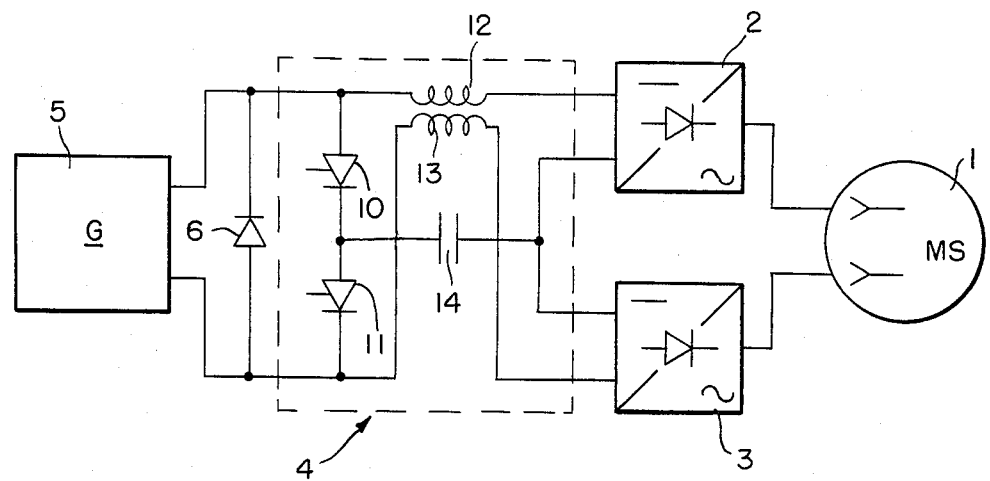
FIG. 1 represents the general scheme of the control circuit conforming to the invention.

Referring now to FIG. 1, the two induction windings of the synchronous motor 1 to be controlled are connected respectively to the output terminals of two oscillators 2 and 3 connected in series, whose input terminals are connected to an intermediary circuit 4 connected to the terminals of an electrical power supply 5, whose output terminals are linked by a diode 6.

A central unit, not represented in the figure, accomplishes the de-energizing of the various thyristors of the circuit.

Figure 4:
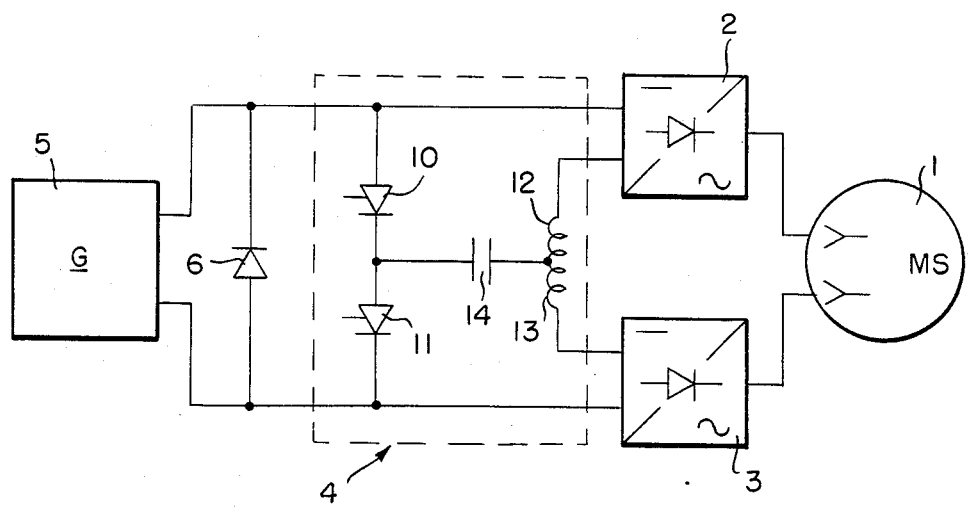

As described below with respect to various modes of realization, the intermediary circuit 4 includes two inductances 12 and 13 with a high coupling factor by mutual inductance, whose principal role is to provide the transfer of current from one induction winding of the motor 1 to the other during starting or low rotation speed of the motor 1, it being understood that when the speed of the motor 1 reaches 5 to 10% of its nominal speed, the motor 1 develops a sufficient electromotive force to ensure the natural de-energizing of the thyristors. The two inductances 12 and 13 above, which also act as leveling inductances, can be realized by aid of a single inductance with a central output point, as represented in FIG. 4. The power supply delivers an intermittent direct current, which can be furnished, for example, by a mixed bridge rectifier assembly which is connected to a source of alternating current, or by an interrupter which is connected to a source of direct current.

Figure 2:
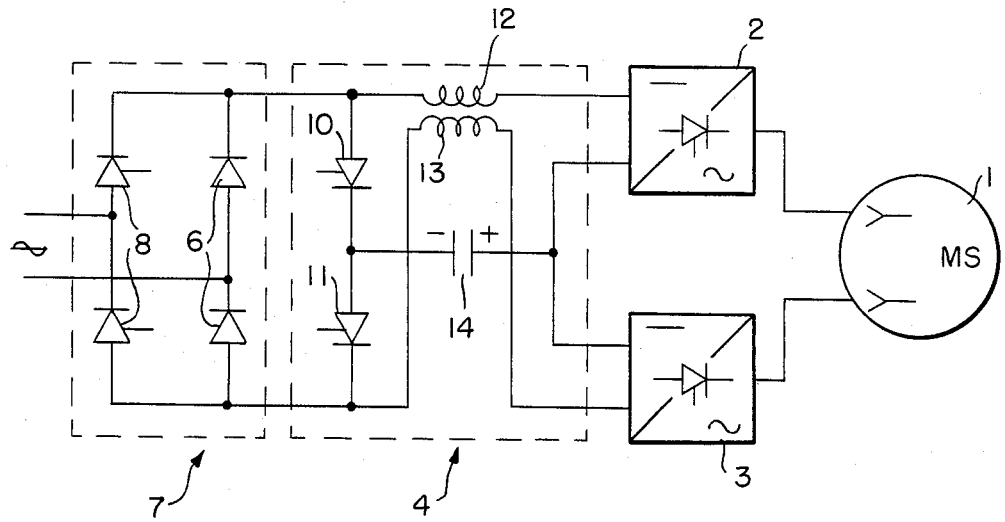
FIGS. 2 through 4 represent respectively various modes of realization of the control circuit according to the invention.

Referring to FIG. 2, the circuit is powered by way of example by a rectifier 7, of the type called mixed bridge, which enables using a much smaller quantity of current than a so-called full bridge rectifier at the low range of the motor. This rectifier 7, in familiar manner, comprises two branches, the one including two thyristors 8 in series, and the other two diodes 6 also in series, connected between the output terminals of the rectifier 7 to which the intermediary circuit 4 is connected.

Between the input terminals of the intermediate circuit 4, two thyristors 10 and 11 are disposed in series, oriented in the same direction. Two inductances 12 and 13 of equal value and magnetically coupled are connected, the first of them 12 between one input terminal of the intermediary circuit 4 and one input terminal of the first oscillator 2, and the second of them 13 between the other input terminal of the intermediary circuit 4 and the input terminal of the second oscillator 3, with polarity opposite to that with which the first one 12 is connected to the first oscillator 2.

The intermediary circuit 4 also includes a condenser 14 connected between the common point of the two thyristors 10 and 11 and the common point of the two oscillators 2 and 3 connecting the other two input terminals of the oscillators with inverted polarity.

The operation of the circuit is as follows:

It is known that to bring about the de-energizing of the conductive thyristors, it is necessary to interrupt the current flowing in these thyristors. The mixed bridge rectifier 7 utilized here does not provide negative voltage, and the condenser 14 advantageously reduces this inconvenience at low speeds of the motor.

Giving consideration to the moment in the cycle when it is necessary to perform commutation of the thyristors of the oscillator 2, it is expected that the rectifier 7 will be in freewheel phase, that is, current is flowing in the diodes 6. The condenser 14 having previously been positively charged on the terminal connected to the oscillators 2 and 3 as indicated in FIG. 2, the thyristor 10 is energized, and a current is established by the discharge of the condenser 14 in the circuit consisting of: diodes 6, thyristor 10, condenser 14, oscillator 3 and the corresponding motor winding, and the inductance 13. Under the effect of the inductances 12 and 13 coupled magnetically, and providing the transfer of current from one winding to the other, the current increases in the inductance 13, and diminishes in the inductance 12, or is negated entirely, which brings about the de-energizing of the previously-conductive thyristors of the oscillator 2 since current no longer flows therein.

Since the sum of the intensities of the current passing across the oscillators 2 and 3 remains constant by virtue of the inductances 12 and 13, the motor torque is not subject to surges. Moreover, since the commutation is effected during the freewheel phase, no perturbation propagates in the power supply line.

The condenser 14 is again charged positively from the side of the oscillators 2 and 3, but its initial charge is reduced and dissipated. Under the effect of the current maintained by the inductance 13, and passing entirely within the oscillator 3, and notably within the condenser 14, this condenser is recharged in the direction of the current, that is, it is positively charged from the side of the thyristors which must conduct in the oscillator 2 10 and 11. Thus the thyristors are de-energized, with the condenser 14 continuing to be recharged. Under the effect of the voltage at the terminals of the condenser, the current tends to flow within the inductance 12 and the oscillator 2, and to diminish proportionally within the oscillator 3, by virtue of the two coupled inductances 12 and 13. The transfer continues in this way until the currents flowing in the oscillators 2 and 3 become equal. The thyristor 10 is thus de-energized naturally. The condenser 14 is thus positively charged from the side of the thyristors 10 and 11 so as to be able to ensure the next commutation of the thyristors of the oscillator 3.

The next commutation having to be made within the oscillator 3, a freewheel phase is chosen in order to de-energize the thyristor 11.

By the discharge of the condenser 14, a current is established in the following circuit: the inductance 12, the oscillator 2 and the corresponding motor winding, the condenser 14, the thyristor 11, and the diodes 6. In the same manner as before, the current within the oscillator 3 terminates, and the condenser 14 discharges. The thyristors thus conducting within the oscillator 3 are de-energized, the charge of the condenser 14 is dissipated, and, under the effect of the current maintained by the inductance 12 and flowing from the oscillator 2 towards the thyristor 11, the condenser 14 begins to be recharged positively from the side of the oscillators 2 and 3. At this instant, a new set of thyristors of the oscillator 3 is energized. The condenser 14 continues to be charged, and under the effect of the voltage at its terminals, the current has a tendency to return within the oscillator 3 and the inductance 13. The transfer continues until the intensity of the current is equal in the two oscillators 2 and 3. This equilibrium being attained, the thyristor 11 is de-energized naturally, the condenser 14 being recharged as indicated in FIG. 2 with a positive charge on the terminal on the side of the oscillators 1 and 2, ready to bring about a commutation of the oscillator 2.

Figure 3:
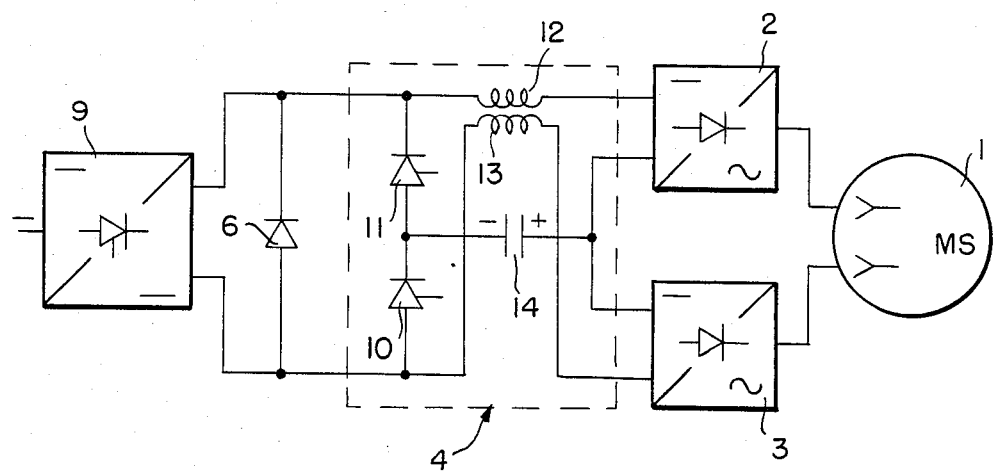

FIG. 3 represents a control circuit equivalent to that represented in FIG. 2. It is powered by a static converter of direct current, for example a chopper 9. For a better comprehension of operation, the diode 6 has been represented outside of the chopper, and placed between its output terminals.

The intermediary circuit 4 of FIG. 3 differs from the circuit of FIG. 2 only by the direction of connection of the thyristors 10 and 11. This control circuit also has two oscillators 2 and 3 distributing the current in the two windings of the motor 1. The operation of this circuit is equivalent to that of the circuit described above. Taking into consideration the moment of the control cycle at which it is necessary to effect a commutation within the oscillator 2, and at which the circuit is in a freewheel phase, the thyristor 10 is energized, and the initial charge of the condenser 14, positive on the side of the oscillator, as indicated in FIG. 3, permits a current to be established in the following circuit: the thyristor 10, the condenser 14, the oscillator 3, and the inductance 13. Under the effect of the voltage of the condenser 14, the current tends to accumulate in this circuit, and, by virtue of the mutual inductance between the inductances 12 and 13, it is terminated in the oscillator 2, the thyristors of which are de-energized. The condenser 14 discharges completely, and begins to be recharged in the direction of the current. A new set of thyristors of the oscillator 2 is then energized. In the same way as in the case of FIG. 2, the condenser 14 continuing to be recharged, the current has a tendency to flow through the oscillator 2. When equilibrium of currents within the oscillators 2 and 3 is established, the thyristor 10 is de-energized naturally. The condenser 14 is thus charged positively from the side of the thyristors 10 and 11, and commutation can be effected in the oscillator 3. For this purpose, the thyristor 11 is energized when the circuit is in freewheel phase, and the charge of the condenser 14 causes the establishment of a current in the following circuit: the inductance 12, oscillator 2, condenser 14, and thyristor 11. By the effect of mutual inductance, the power supply current accumulates in this circuit, and is terminated in the oscillator 3, the thyristors of which are de-energized.

The charge of the condenser 14 continues to diminish, and is dissipated, and then, under the effect of the current maintained by the inductance 12, the condenser 14 is charged in the opposite direction. Then a new set of thyristors of the oscillator 3 is energized, and the charge of the condenser 14 causes a current to flow in the oscillator 3. The equilibrium of currents reestablishes itself within the two oscillators 2 and 3, and the thyristor 11 is de-energized, with the condenser 14 being sufficiently positively charged from the side of the oscillators to effect a new commutation in the oscillator 2.

FIG. 4 represents an apparatus identical to that represented by FIG. 1, but the inductances 12 and 13 are arranged in series between the two oscillators 2 and 3. In practice, what is present is a single inductance with central output point. The condenser 14 is thus connected by the intermediary of these two inductances 12 and 13, with input terminals of inverse polarity of oscillators 2 and 3.

Such a circuit according to the invention offers a number of advantages, since it provides for control of a synchronous motor with two windings, on starting and at low speed of the motor, without engendering irregularities of the motor torque, by virtue of the mutual compensation of the current realized between the windings of the motor. In addition, with the commutations of the two thyristors 10 and 11 being effected during freewheel phases, no perturbation affects the current source, since the current is flowing through the freewheel diode at the time of the commutations. It is to be noted finally that a small number of components is utilized to realize the commutation of twelve thyristors without recourse to a terminal connected to a neutral point of the motor. In short, a single power supply is employed for the two oscillators and the corresponding windings of the motor. Such a circuit is thus useful for the control of railway traction motors, since the motors can furnish powerful torques on starting without mechanical perturbation, and without their power consumption on starting causing electrical perturbations on the distribution line.

Although particular modes of realization have been described, it is obvious that modifications can be made within the spirit and scope of the present invention. The commutator elements utilized to describe the circuits according to the invention are thyristors, elements quantitatively adapted to the currrents necessary for power supply to a railway traction motor. It is evident that other controlled semiconductor elements, such as transistors, could be suitable for commutation of motors of much lesser power.

In the same way, the windings of the motors have been represented in a "wye" configuration, but they could equally be in a "delta" configuration.

I claim:

1. Apparatus for controlling the energization of a synchronous motor having two induction windings, comprising an electrical power supply assembly of the mixed bridge or chopper type delivering a current of predetermined polarity and having output terminals connected by a freewheel branch including at least one freewheel diode with its cathode connected to the positive output terminal of the power supply assembly, two oscillators having outputs connected respectively to the windings of the motor, and an intermediary circuit connected between said power supply assembly and said oscillators, said intermediary circuit having, in combination, input terminals connected to the output terminals of said power supply assembly, respectively, two thyristors connected in series across the input terminals, two inductances of equal value mutually coupled with a high mutual induction coupling factor, and a condenser, one side of said condenser being connected to the junction of said thyristors, and means connecting the input terminals of the intermediary circuit to a first pair of input terminals of said oscillators, respectively, that are of opposite polarity and connecting the other side of said condenser to a second pair of input terminals of said oscillators, respectively, that are of opposite polarity, with said inductances connected in series, respectively, with the terminals of one of said pairs.

2. Apparatus in accordance with claim 1, wherein said inductances are connected in series, respectively, between the input terminals of the intermediary circuit and the terminals of said first pair of input terminals of said oscillators, respectively.

3. Apparatus in accordance with claim 1, wherein said inductances are connected in series, respectively, between said other side of said condenser and the terminals of said second pair of input terminals of said oscillators, respectively.

4. Apparatus in accordance with claim 3, wherein said inductances are constituted by a single inductance having a central point connected to said other side of the condenser.

* * * * *